United States Patent
Cheeseman

(10) Patent No.: US 9,598,058 B2
(45) Date of Patent: Mar. 21, 2017

(54) AIR-GUIDING DEVICE FOR COOLING THE BRAKES IN A MOTOR VEHICLE

(71) Applicant: Bayerische Motoren Werke Aktiengesellschaft, Munich (DE)

(72) Inventor: Neal Cheeseman, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/686,354

(22) Filed: Apr. 14, 2015

(65) Prior Publication Data

US 2015/0217734 A1     Aug. 6, 2015

Related U.S. Application Data

(63) Continuation of application No. PCT/EP2013/071143, filed on Oct. 10, 2013.

(30) Foreign Application Priority Data

Oct. 15, 2012  (DE) .................. 10 2012 218 744

(51) Int. Cl.
*B60R 22/00* (2006.01)
*E05F 15/00* (2015.01)
(Continued)

(52) U.S. Cl.
CPC .............. *B60T 5/00* (2013.01); *B60T 17/002* (2013.01); *F16D 65/847* (2013.01); *G05D 7/06* (2013.01)

(58) Field of Classification Search
CPC ........ B60T 5/00; B60T 17/221; B60T 17/002; F16D 65/827; F16D 65/847
(Continued)

(56) References Cited

U.S. PATENT DOCUMENTS

| 7,009,508 B2 * | 3/2006 | Vertenten .............. B60T 17/221 340/449 |
| 8,474,557 B2 | 7/2013 | Wolf |

(Continued)

FOREIGN PATENT DOCUMENTS

| AN | GB 2269144 A * | 2/1994 | ................ B60T 5/00 |
| CN | 102407835 A | 4/2012 | |

(Continued)

OTHER PUBLICATIONS

International Search Report (PCT/ISA/210) dated Apr. 9, 2014, with English translation (Five (5) pages).

(Continued)

*Primary Examiner* — Isaac Smith
(74) *Attorney, Agent, or Firm* — Crowell & Moring LLP

(57) ABSTRACT

An air-guiding device for cooling the brakes has adjustable air-guiding flaps and an electronic control unit for controlling the air-guiding flaps as a function of the vehicle speed and of the pilot control pressure, triggered by the activation of the brake pedal, in the brake system. A first mode and a second mode for opening the air-guiding flaps are provided in the control unit by a corresponding program module. The first mode is directed to a strong deceleration demand at a relatively high vehicle speed, in particular on freeways and country roads. The second mode is directed to an acceleration prevention demand at a relatively low vehicle speed, in particular when travelling downhill on roads through mountain passes.

8 Claims, 1 Drawing Sheet

(51) Int. Cl.
  *G05D 1/00*   (2006.01)
  *B60T 5/00*   (2006.01)
  *F16D 65/847*   (2006.01)
  *B60T 17/00*   (2006.01)
  *G05D 7/06*   (2006.01)

(58) Field of Classification Search
  USPC ........................................ 188/264 R; 701/49
  See application file for complete search history.

(56) References Cited

U.S. PATENT DOCUMENTS

2010/0258385 A1* 10/2010 Sabelstrom ............... B60T 5/00
                                                    188/71.6
2012/0071075 A1   3/2012 Wolf

FOREIGN PATENT DOCUMENTS

| CN | 102407886 A | 4/2012 | |
| DE | 38 13 972 A1 | 11/1988 | |
| DE | 3813972 A * | 11/1988 | ............... B60T 5/00 |
| DE | 38 34 119 A1 | 4/1990 | |
| DE | 10 2010 037 615 A1 | 3/2012 | |
| GB | 2 269 144 A | 2/1994 | |
| GB | 2 357 477 A | 6/2001 | |

OTHER PUBLICATIONS

German Search Report dated Jun. 6, 2013, with English translation (Nine (9) pages).
Chinese Office Action issued in Chinese counterpart application 201380053530.6 dated Jun. 30, 2016, with English translation (Twelve (12) pages).

* cited by examiner

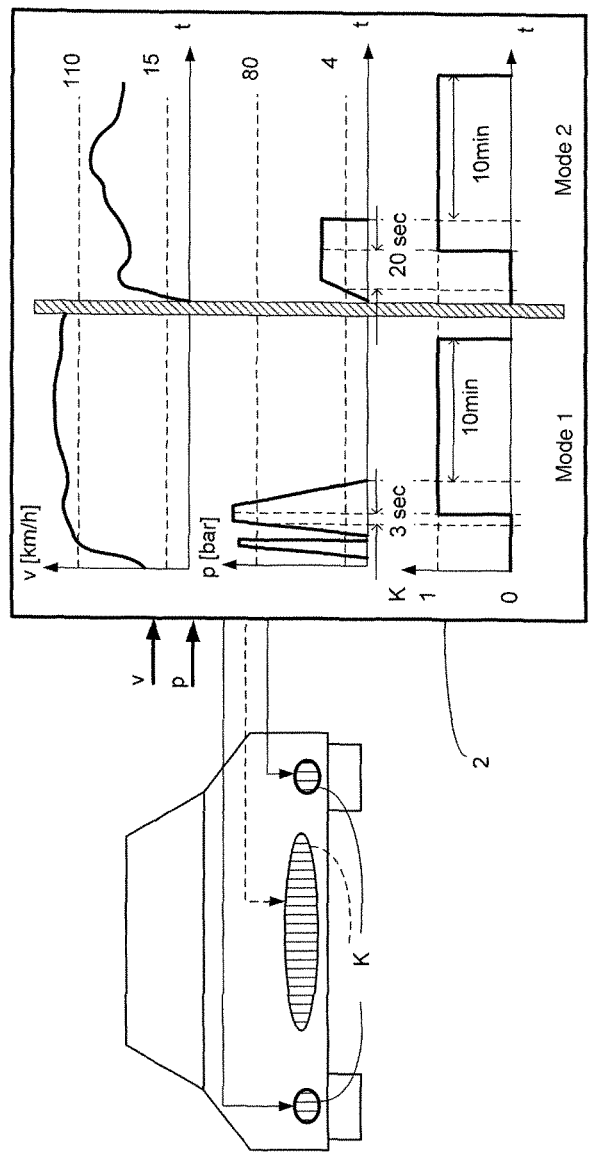

AIR-GUIDING DEVICE FOR COOLING THE BRAKES IN A MOTOR VEHICLE

CROSS REFERENCE TO RELATED APPLICATIONS

This application is a continuation of PCT International Application No. PCT/EP2013/071143, filed Oct. 10, 2013, which claims priority under 35 U.S.C. §119 from German Patent Application No. 10 2012 218 744.8, filed Oct. 15, 2012, the entire disclosures of which are herein expressly incorporated by reference.

BACKGROUND AND SUMMARY OF THE INVENTION

The invention relates to an air-guiding device for cooling the brakes in a motor vehicle with adjustable air-guiding flaps.

For example, DE 10 2010 037 615 A1 discloses an air-guiding device with adjustable flaps for optionally cooling an internal combustion engine or the brakes in a motor vehicle. The radiator discharged air from the engine compartment is used for cooling. The cooling of the brakes depends, in particular, on the intensity and duration of the braking intervention or the temperature of the brake discs. Usually, what is referred to as a temperature model, which takes into account a multiplicity of parameters, is used for this and is stored in a control unit for controlling the flaps.

The object of the invention is to simplify an air-guiding device for cooling the brakes.

This and other objects are achieved according to the invention by an air-guiding device for cooling the brakes in a motor vehicle having adjustable air-guiding flaps and an electronic control unit for controlling the air-guiding flaps as a function of vehicle speed and as a function of pilot control pressure generated in the brake system due to the activation of the brake pedal. A first mode and a second mode for opening the air-guiding flaps are provided in the control unit by way of a corresponding program module. The first mode is designed for a strong deceleration demand at a relatively high vehicle speed, and the second mode is designed for an acceleration prevention demand at a relatively low vehicle speed.

Basically, the air-guiding device according to the invention for cooling the brakes has adjustable air-guiding flaps and an electronic control unit for controlling the air-guiding flaps as a function of the vehicle speed and of the pilot control pressure in the brake system, generated by the activation of the brake pedal. In the control unit, a first mode and a second mode for opening the air-guiding flaps are provided by way of a corresponding program module. The first mode is designed for a strong deceleration demand at a relatively high vehicle speed, in particular on freeways and country roads. The second mode is designed for an acceleration prevention demand at a relatively low vehicle speed, in particular when travelling downhill on roads through mountain passes.

Since the air resistance is worsened and the fuel consumption is increased when the flaps are opened, the invention cools the brakes only in the case of increased demand. Furthermore, only two operating parameters for the flap controller are used, as a result of which the method can be implemented very easily and in a robust fashion.

Other objects, advantages and novel features of the present invention will become apparent from the following detailed description of one or more preferred embodiments when considered in conjunction with the accompanying drawing.

BRIEF DESCRIPTION OF THE DRAWING

The sole FIGURE is a schematic diagram illustrating an exemplary embodiment of the invention.

DETAILED DESCRIPTION OF THE DRAWING

Referring to the FIGURE, a schematic view is provided of a motor vehicle having controllable air flaps K, at least at the level of the wheel brakes, and optionally also centrally toward the engine compartment. The air flaps K are opened or closed by an electronic control unit 2 as a function of the vehicle speed v and as a function of the pilot control pressure p, generated by the activation of the brake pedal, in the brake system. A first mode "Mode 1" and a second mode "Mode 2" for opening the air-guiding flaps K are provided in the control unit 2 by way of a corresponding program module.

The Mode 1 provides for opening of the air flaps K if the vehicle speed v exceeds a defined upper speed threshold value, here for example 110 km/h, and at the same time the pilot control pressure p is above a defined upper pressure threshold value, here for example 80 bar (here, shown above for a second time), for a predefined relatively short time period, here for example 3 sec.

The Mode 2 provides for opening of the air flaps K if the vehicle speed v exceeds a defined lower speed threshold value, here for example 15 km/h, and at the same time the pilot control pressure p is above a defined lower pressure threshold value, here for example 4 bar, for a predefined relatively long time period, here for example 20 sec.

Both in the first mode and in the second mode, after the opening of the air flaps K, they are preferably not closed again until after the expiration of a predefined cooling period, here for example 10 min, starting with the undershooting of the respective pressure threshold value (here 80 bar or 4 bar).

This air flap control according to the invention is distinguished by its reliability and simplicity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. An air-guiding device for cooling brakes in a motor vehicle, comprising:
   adjustable air-guiding flaps configurable to direct air to the brakes in the motor vehicle;
   an electronic control unit operatively coupled with the adjustable air-guiding flaps, the electronic control unit controlling the adjustable air-guiding flaps as a function of vehicle speed and as a function of pilot control pressure generated in a brake system upon activation of a brake pedal,
   wherein the electronic control unit is programmable configured to control the adjustable air-guiding flaps according to a first mode and a second mode,
   wherein the first mode operates to open the adjustable air-guiding flaps if the vehicle speed exceeds a defined upper speed threshold value while the pilot control pressure is above a defined upper pressure threshold value, for a predefined first period of time, and wherein the second mode operates to open the adjustable air-guiding flaps if the vehicle speed is between the upper speed threshold and a defined lower speed threshold value while the pilot control pressure is between the upper pressure threshold value and a defined lower pressure threshold value for a predefined second period of time.

2. The air-guiding device according to claim 1, wherein the first mode operates to open the adjustable air-guiding flaps if the vehicle speed exceeds the defined upper speed threshold value while the pilot control pressure rises, for a second time after a first time, above the defined upper pressure threshold value and is maintained above the defined upper pressure threshold value for the first period of time.

3. The air-guiding device according to claim 1, wherein the predefined first time period is less than the predefined second time period.

4. The air-guiding device according to claim 2, wherein the predefined first time period is less than the predefined second time period.

5. The air-guiding device according to claim 1, wherein both in the first mode and in the second mode, after operating to open the adjustable air-guiding flaps, the adjustable air-guiding flaps are not closed again until after an expiration of a predefined cooling time period that begins with an undershooting of the respective pressure threshold value.

6. A method of operating an air-guiding device for cooling brakes in a motor vehicle, the motor vehicle being equipped with adjustable air-guiding flaps and a programmed electronic control unit that operates to control the air-guiding flaps, wherein the method comprises the acts of:

controlling, via the electronic control unit, an opening of the adjustable air-guiding flaps in a first mode as a function of vehicle speed and as a function of pilot control pressure generated in a brake system of the vehicle upon activation of a brake pedal system; and controlling, via the electronic control unit, an opening of the adjustable air-guiding flaps in a second mode as a function of the vehicle speed and as a function of the pilot control pressure generated in the brake system upon activation of the brake pedal, wherein the first mode operates to open the adjustable air-guiding flaps if the vehicle speed exceeds a defined upper speed threshold value while the pilot control pressure is above a defined upper pressure threshold value for a predefined first period of time, and wherein the second mode operates to open the adjustable air-guiding flaps if the vehicle speed is between the upper speed threshold and a defined lower speed threshold value while the pilot control pressure is between the upper pressure threshold and a defined lower pressure threshold value for a predefined second period of time.

7. The method according to claim 6, wherein the first mode operates to open the adjustable air-guiding flaps if the vehicle speed exceeds the defined upper speed threshold value while the pilot control pressure rises, for a second time after a first time, above the defined upper pressure threshold value and is maintained above the defined upper pressure threshold value for the first period of time.

8. The method according to claim 6, wherein both in the first mode and in the second mode, after operating to open the adjustable air-guiding flaps, the adjustable air-guiding flaps are not closed again until after an expiration of a predefined cooling time period that begins with an undershooting of the respective pressure threshold value.

* * * * *